Patented June 13, 1933

1,914,134

UNITED STATES PATENT OFFICE

IGNACE J. KRCHMA, OF TERRE HAUTE, INDIANA, ASSIGNOR TO COMMERCIAL SOLVENTS CORPORATION, OF TERRE HAUTE, INDIANA, A CORPORATION OF MARYLAND

PROCESS OF RECOVERING DILUTE ACIDS

No Drawing. Application filed May 18, 1929. Serial No. 364,328.

The present invention relates to an improved method of recovering organic acids from dilute aqueous solutions. More especially, it relates to a method of recovering acetic acid from dilute aqueous solutions obtained in esterification processes such as the production of butyl acetate by refluxing butanol and acetic acid in the presence of a catalyst.

In carrying out an esterification process on a commercial scale it is very essential that as complete recovery of the various reacting materials be made as possible. In many such commercial processes where competition is keen the recovery in a useful form of all of these materials is the essential factor in successful operation of the processes. This is well illustrated by the manufacture of butyl acetate from butanol and acetic acid. In this process butanol and acetic acid are charged into a reaction kettle in the proportion of approximately 5.2 lbs. of butanol to approximately 3.57 lbs. of acetic acid. About 1% of 66° Bé. sulphuric acid is employed as a catalyst. Heat is then applied to the reaction kettle and the butanol and butyl acetate constant-boiling mixture with water distilled off as rapidly as possible, the butyl acetate layer being returned to the kettle and the water layer sent to a process storage tank. This fractionation is continued until the two layers cease to appear and the butyl acetate distillate is only slightly acid and is substantially free from water.

The aqueous fraction obtained from a charge consisting of 60,600 lbs. of dry butanol and 57,800 lbs. of 70% acetic acid amounts to approximately 5,660 gallons and contains 5% to 8% of butanol, traces of butyl acetate and 2.5% to 5.0% of acetic acid.

A number of possible methods of recovering these materials have been suggested, but for various reasons most of them are impractical from an operating standpoint. Butanol, on account of its limited miscibility with water and due to the fact that the two form a constant boiling mixture which distills below the boiling point of water, can be simply recovered from the above solution. The constant boiling mixture containing over 60% of butanol is distilled off and upon condensation separates into two layers, the upper being butanol containing only a small proportion of water. The recovery of the acetic acid from such dilute solutions, however, is entirely another matter, it not being practical to effect a separation by distillation either at atmospheric or reduced pressure due to the strong affinity between water and acetic acid and also to the large volume of water which must be distilled. Furthermore, the heat expenditure is high compared with that for other liquid mixtures. It has been suggested that the acetic acid be neutralized by an alkali material such as soda ash or calcium carbonate, but such a procedure would require the evaporation of large quantities of water in order to obtain the solid acetates and then the conversion of the latter to acetic acid by means of a mineral acid, as for example, concentrated sulphuric acid, a procedure which is both expensive and tedious. Other suggestions have involved the distillation of dilute aqueous solutions of acetic acid either with solvents which are immiscible with water and have a boiling point higher than acetic acid, or with solvents which are immiscible with water and form with the latter systems having constant boiling points which are low.

All of the processes previously suggested for the recovery of acetic acid from dilute aqueous solutions have certain disadvantages in connection with esterification processes not possessed by my improved process, which consists essentially of extracting the acetic acid with butanol and then using the butanol extract in a subsequent esterification. This procedure gives an effective recovery of 80% to 90% of the acetic acid which formerly went to waste in the water layer, the percentage of acid recovered being to a large extent dependent upon the volume of water layer as compared to the amount of the alcohol which can be employed, the latter being fixed by the amount of alcohol that can be used in the next esterification charge. For example, when extracting once a 5% aqueous acetic acid solution resulting from an esterification charge with the full amount of butanol to be employed in a subsequent esterification charge, a 75% recovery of acetic acid is obtained. If, however, this same amount of butanol is divided into two parts and the acetic acid solution extracted twice, the total recovery is increased to 85%. By extracting three times with the same total volume of extractant a recovery of 89% of the acetic acid is obtained; by extracting the solution similarly six times, the recovery is increased to approximately 93%. The combined extracts may then be treated according to any of several different methods, depending largely upon the particular esterification process being carried out, the equipment available, etc. If desired, the butanol-acetic acid-water mixture may be subjected to the same type of process employed for the refining of butanol. On distilling the mixture a constant boiling mixture of butanol, water and small amount of acid and ester comes over. This mixture forms two separate layers on condensing, the butanol layer containing a small amount of dissolved water being returned to the still and the water layer either discarded or further treated to recover the small amounts of butanol, acetic acid and ester that may be present. By employing as the extractant crude butanol instead of the anhydrous material, it is possible to eliminate one distillation when producing butyl acetate in conjunction with the manufacture of butanol since the crude butanol is already saturated with water at the beginning of the operation and hence its distillation after being used as the extractant renders it satisfactory for use in esterification without the necessity of two separate distillations. If desired, instead of distilling to remove the water dissolved in the butanol used as the extractant, this crude or wet butanol-acetic acid mixture may be used directly in a succeeding esterification charge.

The acetic acid ordinarily used in esterification processes consists, as a rule, of only 70% to 80% of acetic acid, together with 20% to 30% of water. A certain amount of water is also formed as a result of the esterification process. If in the esterification wet butanol from a previous extraction is employed, there is obtained about 50% more water in the final reaction product than when dried extract is used. As a result an increased amount of acetic acid will go into the larger water layer on distillation. Such an increase affects somewhat the operation of the extraction process in that a slightly lower recovery of the acetic acid is obtained unless the number of extractions is increased. If, for example, instead of carrying out the reaction with substantially anhydrous materials, the reaction charge is made up of 31,300 lbs. of 80% acetic acid and 46,400 lbs. of 80% butanol, the reaction product will contain 9,300 lbs. of water from the wet butanol, 6,300 lbs. of water from the wet acetic acid and 7,930 lbs. of water formed during the reaction, giving a total of 23,530 lbs.

Carrying out the recovery of acetic acid from dilute aqueous solutions by alcohol extraction on a plant scale is comparatively a simple operation. The aqueous acetic acid solution obtained from an esterification charge is placed in a suitable tank provided with means for agitating the liquid contained therein. Preferably, it should be a closed tank to eliminate losses by evaporation. For the agitation, a mechanical stirrer may be employed or a compressed inert gas may be used, but in the latter case it is usually advisable to have available a solvent recovery apparatus to recover any solvent entrained by the gas stream. To the aqueous acetic acid solution in the tank is then added a suitable amount of butanol or other alcohol of the same character as that being employed in the esterification process. As a rule, from one-third to one-sixth of the amount of alcohol required for a succeeding esterification charge is employed, the amount used depending upon the specific alcohol being used, and upon the acid being recovered and also depending upon whether a substantially water-free or crude alcohol (containing substantial amounts of water) is employed as the extractant. The aqueous acetic acid solution and alcohol extractant are then well agitated and allowed to settle. After this the alcohol layer is drawn off and a fresh portion of alcohol added to the water layer left in the tank, and the resulting layer again agitated. This operation is repeated from two to six times, depending upon the specific operating conditions and the recovery desired. In plant scale operation two extractions have given on an average 70% recovery, which was increased to 76% by extracting three times.

As indicated above, either of two procedures may be followed with the alcohol fraction which has been used to extract the acetic acid from the water. In esterification practice this butanol fraction containing some water and the recovered acetic acid may be directly used in another charge without further treatment, the necessary amount of additional acetic acid required to complete the esterification being added. In case, however, it is undesirable to introduce with the esterification charge the additional water carried by the wet butanol, the latter may be subjected to the same distillation procedure followed in the case of ordinary wet butanol. The water, containing only traces of acetic acid, comes off as a constant boiling point mixture with a portion of the butanol, leaving a practically anhydrous butanol containing dissolved acetic acid. The butanol-water distillate separates into a water layer containing some butanol and a butanol layer containing about 20% water, which may again be distilled.

Obviously, the process of extracting acetic acid from dilute aqueous solutions thereof may be satisfactorily carried out in a number of ways without leaving the concept of my invention. For example, instead of using only one extraction tank requiring the settling and drawing off of one layer of the liquid, a series of tanks may be employed in such a manner as to enable one to carry out the extraction countercurrently in steps, thereby also increasing to some extent the efficiency of the process. A satisfactory method of procedure is to employ four tanks similar to that specified above, placed side by side and provided with suitable connections. In each of these four tanks is then placed a batch of dilute acid liquor from an esterification charge. The entire quantity of alcohol to be employed in a subsequent esterification charge is then placed in tank #4, and the mixture brought to equilibrium by agitation. After settling, the top (alcohol) layer is discharged into tank #3 and the mixture again brought to equilibrium by agitation. After settling, the top layer is sent to tank #2 and finally to tank #1, after which it is sent to charge the esterification still. The water layer of tank #4 is then discharged, and the water layer of tank #3 advanced to #4, that of #2 to #3, and that of #1 to #2, and a new batch of aqueous distillate coming from an esterification charge sent to #1. Then a new batch of alcohol is again advanced by steps from #4 to #1 and the entire operation repeated. Carrying out the process in this way results in a countercurrent effect so that the water fraction containing the least acid comes in contact with alcohol containing the least acid and consequently results in better efficiency.

In the examples cited above, the application of my process to the recovery of acetic acid by the use of butanol as the extractant has been described. It is distinctly understood, however, that my process is not limited solely to the use of these materials but may also be applied in connection with other esterification processes such as, for example, the production of amyl acetate, hexyl acetate, butyl butyrate, etc. The essential factors governing the application of my process are that the alcohol employed be a solvent for the acid which it is desired to recover and that it also not be miscible with water in all proportions. This is to be taken to include the so-called "immiscible" alcohols as well as those which are partially miscible with water. It is also understood that the method of procedure outlined above may be varied without leaving the concept of my invention.

Now having described my invention, what I desire to claim is:

1. Process for the recovery of water soluble aliphatic acids from dilute aqueous solutions thereof which comprises extracting said acids with two to six portions of butyl alcohol.

2. Process for the recovery of acetic acid from dilute aqueous solution thereof which comprises extracting said acid with two to six portions of butyl alcohol.

3. In a process for the production of butyl acetate by the reaction of butyl alcohol and acetic acid, the step which comprises recovering unreacted acetic acid from the aqueous distillate fraction by extracting the latter with butyl alcohol to be used in a succeeding esterification.

4. In a process for the production of butyl acetate by the reaction of butyl alcohol and acetic acid, the step which comprises recovering unreacted acetic acid from the aqueous distillate fraction by extracting the latter with the butyl alcohol to be used in a succeeding esterification, the butyl alcohol being divided into from two to six fractions so that the extraction may be carried out in several steps.

5. In a process for the production of butyl acetate by the reaction of acetic acid and butyl alcohol, the step which comprises recovering unreacted acetic acid from the aqueous distillate fraction by extracting the latter with the butyl alcohol to be used in a succeeding esterification and finally using said alcohol-acid solution in a new esterification charge.

6. In a process for the production of butyl acetate by the reaction of acetic acid and butyl alcohol, the steps which comprise recovering unreacted acetic acid from the aqueous distillate fraction by extracting the latter with aqueous butyl alcohol.

7. In a process for the production of butyl acetate by the reaction of acetic acid and butyl alcohol, the steps which comprise recovering unreacted acetic acid from the aqueous distillate fraction by extracting the latter with aqueous butyl alcohol, and then removing the water from said butyl alcohol solution by distillation.

8. In a process for the production of butyl acetate by the reaction of acetic acid and butyl alcohol, the step which comprises recovering unreacted acetic acid by countercurrently extracting the latter with the butyl alcohol to be used in a subsequent esterification.

9. A process for substantially completely esterifying an aliphatic monocarboxylic acid which comprises reacting said acid with an aliphatic alcohol which is not miscible with water in all proportions, distilling to recover the esters and an aqueous layer of distillate containing the unreacted acid, recovering the unreacted acid from said aqueous layer by extraction with the alcohol to be used in a subsequent esterification, and subjecting the resulting alcoholic solution of the acid to esterification in a succeeding esterification charge.

10. A process for substantially completely esterifying an aliphatic monocarboxylic acid with butyl alcohol which comprises reacting said acid with butyl alcohol, distilling to recover the ester and an aqueous layer of distillate containing the unreacted acid, recovering the unreacted acid from said aqueous layer by extraction with the butyl alcohol to be used in a subsequent esterification, and subjecting the resulting alcoholic solution of the acid to esterification in a succeeding esterification charge.

11. A process for substantially completely esterifying an aliphatic monocarboxylic acid which comprises reacting said acid with an aliphatic alcohol which is not miscible with water in all proportions, distilling to recover the esters and an aqueous layer of distillate containing the unreacted acid, recovering the unreacted acid from said aqueous layer by counter-current extraction with the alcohol to be used in a subsequent esterification, and subjecting the resulting alcoholic solution of the acid to esterification in a succeeding esterification charge.

12. A process for substantially completely esterifying an aliphatic monocarboxylic acid with butyl alcohol which comprises reacting said acid with butyl alcohol, distilling to recover the ester and an aqueous layer of distillate containing the unreacted acid, recovering the unreacted acid from said aqueous layer by counter-current extraction with the butyl alcohol to be used in a subsequent esterification, and subjecting the resulting alcoholic solution of the acid to esterification in a succeeding esterification charge.

13. A process for substantially completely esterifying an aliphatic monocarboxylic acid which comprises reacting said acid with an aliphatic alcohol which is not miscible with water in all proportions, distilling to recover the esters and an aqueous layer of distillate containing the unreacted acid, recovering the unreacted acid from said aqueous layer by extracting with 2 to 6 portions of the alcohol to be used in a subsequent esterification, and subjecting the resulting alcoholic solution of the acid to esterification in a succeeding esterification charge.

14. A process for substantially completely esterifying an aliphatic monocarboxylic acid with butyl alcohol which comprises reacting said acid with butyl alcohol, distilling to recover the ester and an aqueous layer of distillate containing the unreacted acid, recovering the unreacted acid from said aqueous layer by extracting with 2 to 6 portions of the alcohol to be used in subsequent esterification, and subjecting the resulting alcoholic solution of the acid to esterification in a succeeding esterification charge.

In testimony whereof I affix my signature.

IGNACE J. KRCHMA.